Figure 1:
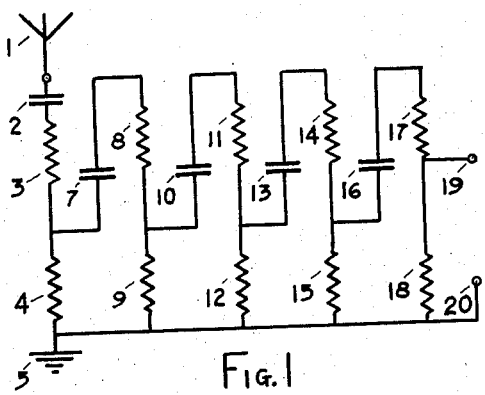

April 28, 1959  R. LAMBERT  2,884,520
INTERFERENCE DEGENERATORS

Original Filed July 26, 1952  4 Sheets-Sheet 1

INPUT FILTER

COUPLING UNIT

COUPLING UNIT

INVENTOR.
RAY LAMBERT
BY
HIS ATTORNEY

April 28, 1959  R. LAMBERT  2,884,520
INTERFERENCE DEGENERATORS

Original Filed July 26, 1952  4 Sheets-Sheet 2

INTERFERENCE DEGENERATOR

INTERFERENCE DEGENERATOR

INVENTOR.
RAY LAMBERT
BY
HIS ATTORNEY

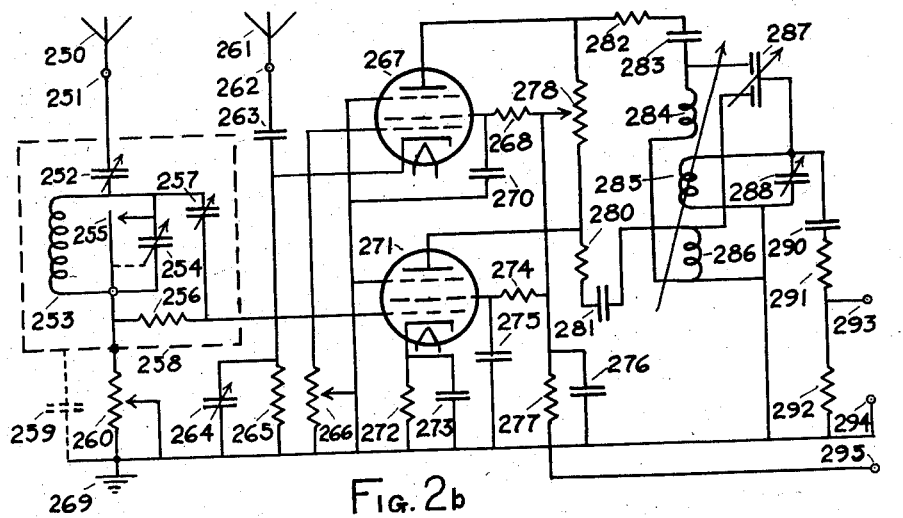
Fig. 2b
INTERFERENCE DEGENERATOR
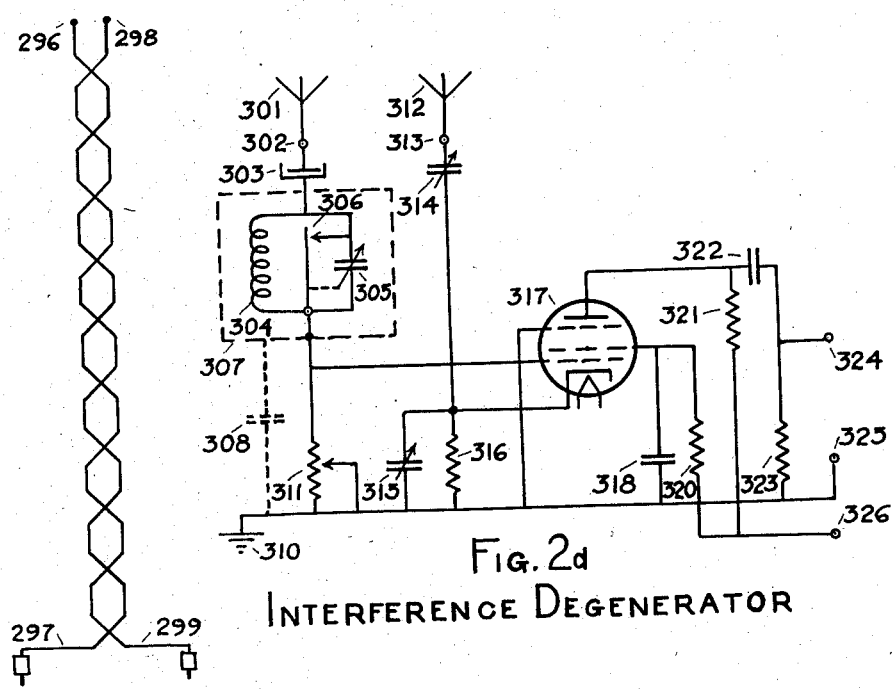
Fig. 2c
AERIAL
Fig. 2d
INTERFERENCE DEGENERATOR
INVENTOR.
RAY LAMBERT
BY
HIS ATTORNEY

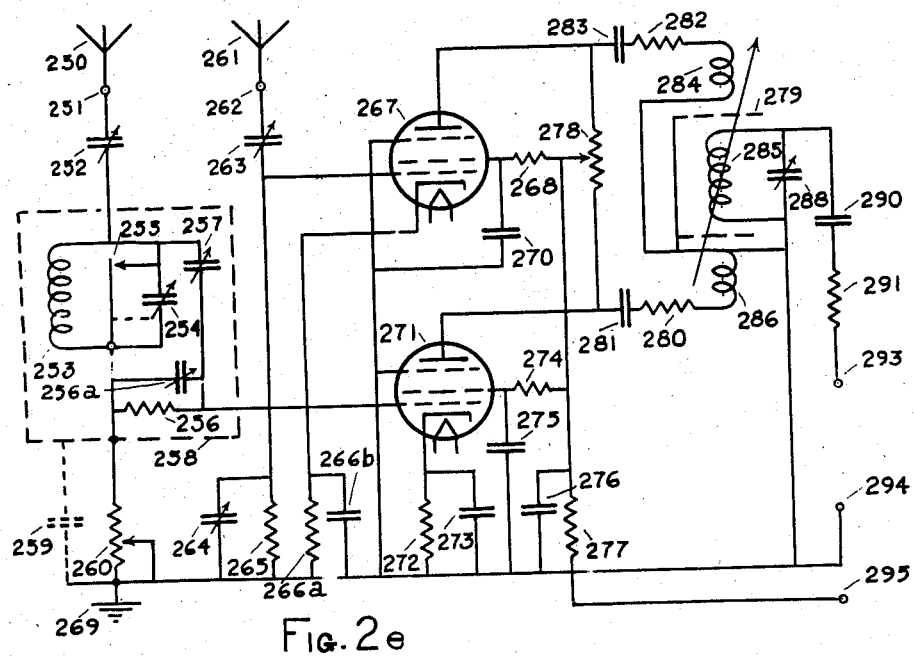
Fig. 2e
INTERFERENCE DEGENERATOR
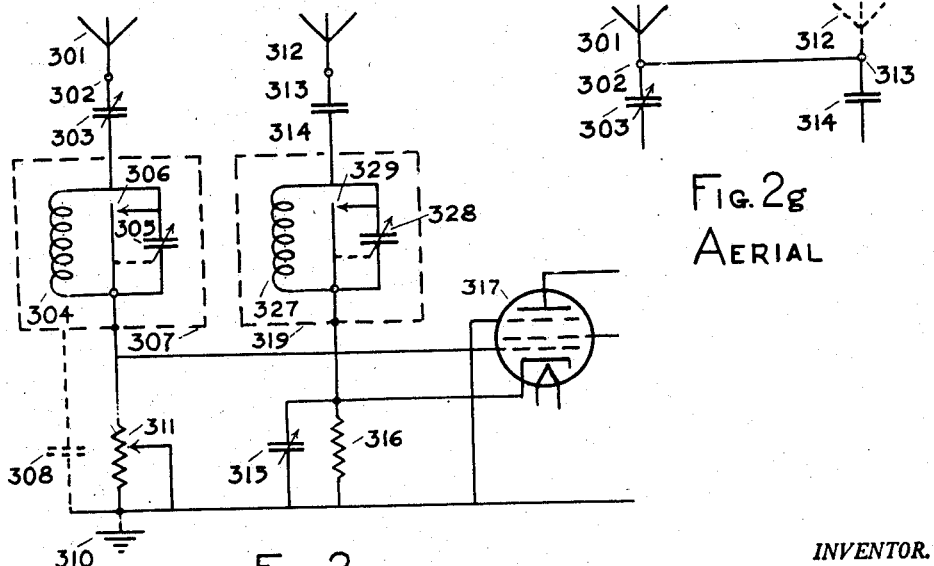
Fig. 2f
INTERFERENCE DEGENERATOR
Fig. 2g
AERIAL
INVENTOR.
RAY LAMBERT
BY
HIS ATTORNEY

United States Patent Office 2,884,520
Patented Apr. 28, 1959

2,884,520

INTERFERENCE DEGENERATORS

Ray Lambert, Cincinnati, Ohio

Original application July 26, 1952, Serial No. 301,055, now Patent No. 2,791,686, dated May 7, 1957. Divided and this application November 19, 1956, Serial No. 626,796

10 Claims. (Cl. 250—20)

My invention relates to radio noise control and more particularly pertains to the elimination of certain electrical impulses causing noise and entering the receiving system through the aerial.

This application is a division of application No. 301,055, filed on July 26, 1952, now Patent No. 2,791,686, granted on May 7, 1957.

The effects of relatively sudden variations in the electrical potential gradient of the atmosphere and random electromagnetic radiations produce the effects known as static or atmospherics in voltage amplitude modulated radio receivers. These noise impulses are encountered not only in the common broadcast band but in bands above and below, including high frequency and television service. Added to these natural disturbances are many arising from artificial causes and affecting reception through the aerial. The problem is to eliminate the effects of these electrical impulses entering through the aerial.

Noise (electrical impulses resulting in noise) that enters the receiver at other points than the aerial may be excluded by well known means of circuit shielding and power line filtering. Noises of nearby origin that enter the receiver through the aerial in some cases may be suppressed through separate pick-up and noise-signal opposition. Means of noise supression mentioned in this paragraph are not included in this disclosure.

Noise effects may be caused by the impulse excitation of tuned circuits and other circuits capable of oscillating under electrical shock or impulse. Very sudden or instantaneous impulses produce equal voltage amplitudes in all simple tuned circuits. The response differs in the duration of the ensuing wave train in the tuned circuit as a function of the circuit Q or decrement and as a function of the natural frequency of the tuned circuit. The effects of noise impulses having a longer time of voltage rise (lower $dE/dt$) differ between circuits of different frequency having, in general, a greater effect the lower the frequency of the tuned circuit.

The form of the response in terms of the voltages developed in a tuned circuit by a sharp or instantaneous impulse is expressed by the formula $$E = Ve^{-rt/2L} \cos \omega t$$

and the response of a tuned circuit under the impact of a voltage variation the duration of which is much greater than the period of the tuned circuit is given by the relation $$E = (V/RC)\left[\frac{2Le^{-t/RC}}{r^2 + 4L^2\omega^2} + e^{-rt/2L} \cos\left(\omega t - \cos^2 \frac{-r}{\sqrt{r^2 + 4L^2\omega^2}}\right)\right]$$

In the above expressions V is the voltage of the impulse having a time constant RC, and $r$, $L$, and $\omega$ represent resistance, inductance and angular velocity in the tuned circuit. Atmospheric or static impulses have a time constant much greater than the period of oscillation of a tuned circuit in the broadcast band.

The noise effects discussed above may be studied and measured without the presence of a radio frequency signal in the system. A greater cause of noise in radio reception is the modulation of the carrier in the radio frequency amplifier and frequency conversion tubes by the noise impulses. This is due simply to the fact that in most cases these tubes offer different transconductance values with different grid potentials. Hence, a static impulse in changing momentarily the grid voltage changes momentarily the amplification of the signal, causing modulation. After the carrier is modulated in such a manner the noise cannot be removed subsequently in the radio receiver circuit. At this point the noise impulses become a part of the audio signal and cannot be removed any more than an element of speech or music. The operation of the radio frequency tubes on the straight portion of the grid-voltage plate-current $(E_g-I_p)$ curve is essential for the purpose of noise suppression.

The principal object of my invention is to eliminate atmospheric noises.

Another object of my invention is to provide for the operation of amplifier tubes on the straight portion of the grid-voltage plate-current $(E_g-I_p)$ characteristic or over a range affording constant transconductance. Due to the influence on associated input impedance values and phase relations, the grid swing of the amplifier tubes should be restricted not only to the linear portion of the grid-voltage plate-current $(E_g-I_p)$ characteristic but also should be kept below the voltage at which grid current begins to flow.

Another object of my invention is to provide means for effective filtering of long voltage swings on the input of the first tube.

Another object is to provide for the diversion of the total signal into two branches, inversion and cancellation of noise impulses entering through the aerial, in the presence of a desired radio frequency signal. An essential requirement of this operation is that no tuned circuit may be used in the line of cascade amplification preceding this operation.

In general, my invention comprises an input filter utilizing resistances and condensers only, excluding inductive reactances to avoid impulse excitation. A special phase rotating design is employed, utilizing as each high-pass member a resistance in series with a condenser. I employ a linear interference degenerator which operates on the basic principle of a bridge circuit to which is added means of inverting the signal voltage from one corner of the bridge and causing it to cancel the signal from the opposite corner. To prevent cancellation of the radio signal a phase rotating and filtering device, consisting of a tuned circuit, is inserted in series with one bridge arm.

Figure 1A:
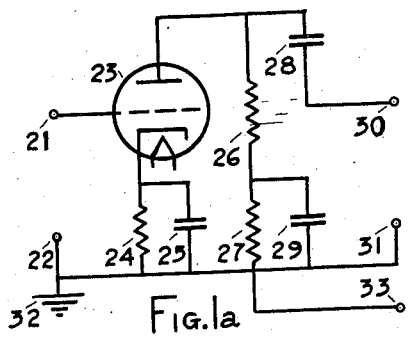
Figure 1B:
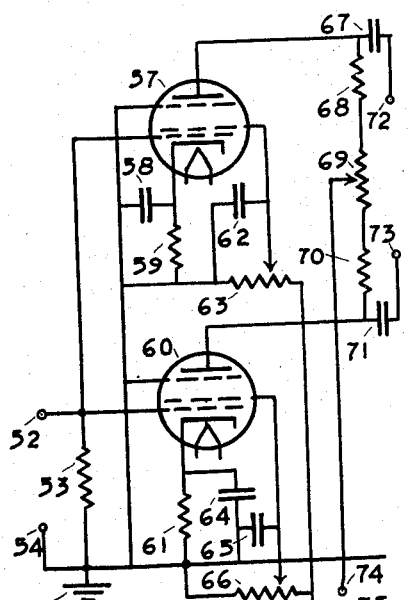
Figure 2:
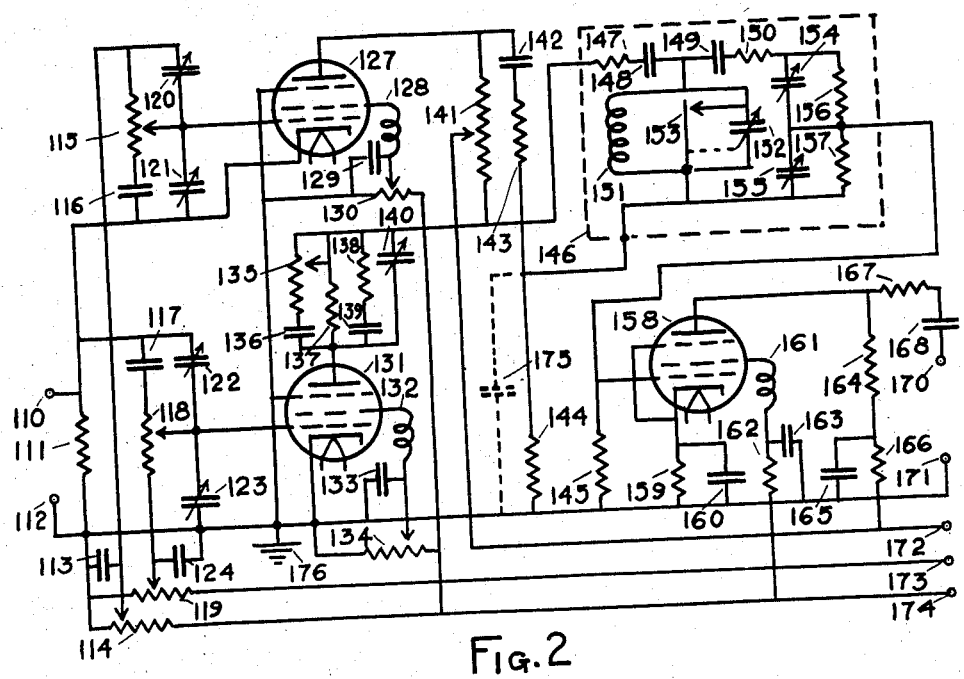
Figure 2A:
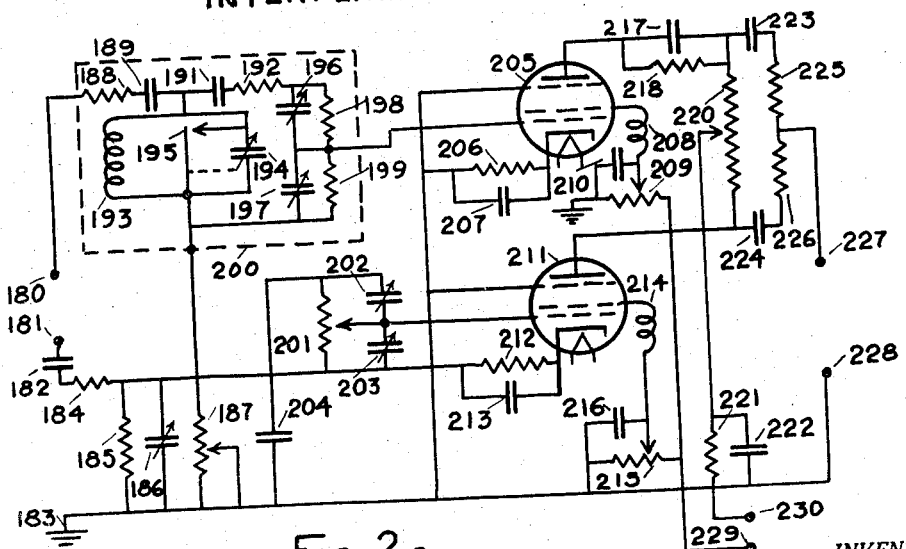

In the schematic drawings:

Fig. 1 is a representation of the input filter;
Fig. 1a is a coupling unit;
Fig. 1b is a modified form of coupling unit;
Fig. 2 represents the linear interference degenerator;
Fig. 2a is a modification of the diagram of Fig. 2;
Fig. 2b is another modification of the diagram of Fig. 2;
Fig. 2c is a representation of an aerial;
Fig. 2d is another modification of the diagram shown in Fig. 2;
Fig. 2e shows a modification of the diagram of Fig. 2b;
Figs. 2f and 2g show modifications of Fig. 2d.

Throughout this description it will be assumed that the amplifier tubes are operated linearly, with grid swing confined to the linear portion of the grid-voltage plate-current ($E_g$—$I_p$) characteristic and that the most positive grid swing does not draw grid current.

Long voltage swings on the grid of the first tube are prevented effectively by the RC echelon filter shown in Fig. 1. This filter uses resistances and condensers only, chokes or inductances being omitted because of their undesirable tendency to oscillate when subjected to electrical impulses. This filter is a high pass filter using as the horizontal member in each section a condenser and resistance in series, each section being by-passed to ground through a resistance.

Referring to the drawings, in Figure 1, I provide an aerial 1, connected to condenser 2 and in turn connected to resistance 3. I show in series similar condenser and resistance units 7, 8, 10, 11, 13, 14, 16 and 17. It is not intended that the number of units illustrated in the drawing shall be conclusive but any one or more of said units may be employed depending upon signal strength and noise level. These condenser and resistance units are designed to pass the frequency of the desired band. The grounding members are the resistances, 4, 9, 12, 15 and 18. These are designed to pass to ground the frequencies below the desired band.

The values of the condensers 2, 7, 10, 13 and 16 and the values of the resistances 3, 8, 11, 14 and 17 should be selected with reference to the band in which operation is desired.

Care should be taken to minimize the stray capacity shunts across the resistances by mounting away from the ground or grounded objects as far as possible.

For maximum high pass, capacity to ground should be avoided between condensers 2, 7, 10, 13 and 16 and ground and between resistances 3, 8, 11, 14 and 17 and ground 5.

The tube 23 in Fig. 1a and its associated output load serves the purpose of coupling between the filter group, Fig. 1, and the input to the next unit of the receiver circuit and noise control system, shown in Fig. 2. It raises the signal level to compensate for the attenuation imposed by the RC echelon filter, Fig. 1 and, in some cases, may accommodate a greater peak of peak signal voltage.

The tube 23 is connected to the following circuit through the condenser 28, and plate coupling load 26. A conventional bias arrangement for tube 23 is illustrated, using resistance 24 and condenser 25. Resistance 27 and condenser 29 may be employed as a decoupling filter. Lead 33 is connected to the plate voltage supply. A suitable ground 32 is provided. The output terminals 19 and 20 of the input filter are connected to terminals 21 and 22 of the coupling unit shown in Fig. 1a and its output terminals 30 and 31 are connected to terminals 110 and 112 (Fig. 2) of the linear interference degenerator.

Inversion and cancellation of atmospheric noise is accomplished by splitting the noise impulse signal and opposing the signal in the two branches for cancellation. In one of these branches the incoming (desired) sinusoidal radio signal is subjected to filtering and phase rotation. It is of fundamental importance to avoid the impression of the noise impulse upon cascade tuned circuit elements before inversion and cancellation.

Fig. 2 shows a circuit by which these operations may be accomplished. The signal entering at 110 and 112 is impressed across resistance 111. The signal voltage impressed across resistance 111 is divided and inverted in one branch, by tube 131. This signal is applied simultaneously to the grid of tube 131 and the cathode of tube 127. With circuit components properly adjusted and with switch 153 closed, there will be voltage equality and phase opposition impressed across the common plate load resistance 144. This causes cancellation of all signals, both atmospheric and desired program, across the output load resistance 144. With switch 153 open and the parallel tuned circuit (coil 151 and condenser 152) tuned near resonance with the desired signal, there will be a phase change and signal reduction across 151, preventing this branch of the tuned signal from cancelling with that from tube 127. This output is impressed across resistance 145 which is the grid resistance of the coupling and amplifying tube, 158. The shield 146, connected to the top of the load 144 prevents capacity to ground from changing as the tuning of condenser 152 is varied.

In order to provide perfect inversion and cancellation there must be no transfer of signal energy across tube 127 through its cathode-anode capacity. To neutralize this effect the grid of tube 127 is grounded through a resistance potentiometer 115. With the proper relation between the signal voltage impressed upon the grid by capacity coupling with the cathode and the signal voltage impressed upon the plate by the cathode-plate capacity, and with the proper adjustment of potentiometer 115 and condensers 120 and 121, the capacity signal transfer through the tube 127 will be cancelled. Since the phase relations of the input to tube 131 must correspond and also in order to equalize the signal voltages at the output, the mesh consisting of potentiometer 118 and condensers 122 and 123 is provided.

Any of the well known methods of securing the desired bias potentials between the grid and cathode of the tubes may be used. In Fig. 2 the condensers 116 and 117 are of relatively large values and serve to isolate direct voltages. The screen voltage supply of these tubes is conventional.

The plate circuit of tube 131 should be equalized with that of tube 127, which contains the mesh including the resistance 111 with the associated input apparatus (26, 28 and the plate impedance to tube 23 in Fig. 1a), 115 shunted by 120 and 121, 118 shunted by 122 and 123, together with associated distributed capacity. In order to introduce this equalizing factor in the plate circuit of tube 131, the mesh consisting of resistances 135, 137 and 138 and condensers 136, 139 and 140 is provided in the plate circuit of tube 131. It is important that equality of phase relations be maintained between indicated groups of impedances or meshes regardless of frequency. Resistance 135 is to match the plate resistance of tube 23 (Fig. 1a shunted by resistance 26). Resistance 137 equals 111, while 138 equals the parallel combination of 115 and 118 and the condenser 139 equals the parallel combination of 116 and 117. The variable or adjustable condenser 140 is used to compensate for distributed capacity in the input mesh.

The common signal load is resistance 144 in Fig. 2. These tubes 127 and 131 should be selected for approximate similarity of operation. The voltages of the plates of tubes 127 and 131 are equalized by adjusting screen potentiometers 130 and 134, shunted from variable arms to ground by by-pass condensers 129 and 133 respectively and the grid bias controls 114 and 119 shunted from variable arms to ground by condensers 113 and 124 respectively. The plate resistors consist of the two sections of potentiometer 141 providing an additional means of equalizing the tube circuits.

The phaser consisting of the inductance 151 and condenser 152 is set in oscillation by impulse excitation due to atmospherics passed by tube 131. If the output of the linear interference degenerator were taken directly at the top of resistance 144 some atmospheric interference would be experienced due to capacity coupling to ground from the plate circuit of 131 or the top of the phaser. To compensate for this phaser current through resistance 144, the mesh including condensers 154 and 155 and resistances 156 and 157 is provided. This is a facsimile of the stray coupling to ground just described in which resistance 156 is to resistance 157 as the plate resistance of tube 131 is to the coupling resistance 144, and in which the associated shunting capacities 154, 155, the plate capacity of tube 131 and 175 bear a corresponding reciprocal relation. In this manner the stray phaser voltage across 144 is cancelled by the phaser voltage across 157. With this cancellation of the stray phaser signal, the chief action of the phaser is that of a filter, when the phaser is tuned to resonance with the desired signal.

Circuit branches shown as resistances 144 and 157 may be made inductive or may be portions of a common reactive or tuned circuit with adequate provision for correct phase and voltage relations, or each of these resistances may be shunted by an inductance.

The tube 158 together with its associated impedance meshes comprising grid resistance 145 and the cathode resistance 159 and shunting condenser 160 and the screen resistance 162 and its shunting condenser 163, plate load resistance 164, and filter consisting of its resistance 166 and condenser 165 serves as a coupling medium between the output of the linear interference degenerator proper and the first stage of conventional radio voltage amplification. The output of tube 158 is connected to terminal 170 through resistance 167 and condenser 168. The coupling medium is connected to the input tuned circuit of a conventional radio receiver at terminals 170 and 171. A terminal 173 is provided for negative bias voltage. Terminals 172 and 174 connect to plate supply voltages. A ground is provided at 176. The plate circuit of this tube 158 may contain the customary reactive elements. The coils 128, 132 and 161 absorb the impulses of the screen partition current and the condenser-resistance combinations 142 and 143, and 147 and 148, serve to suppress tube noises from the plates of tubes 127 and 131. The condenser-resistance combination 149 and 150 matches the effect of condenser-resistance combination 147 and 148.

In Fig. 2a is shown an arrangement of the linear interference degenerator circuit in which the phaser is placed in the input of the inversion stage rather than in the output, as shown in Fig. 2. The circuit of Fig. 2a may be connected to the filter shown in Fig. 1 through the circuit shown in Fig. 1b.

The signal is split at the common input terminals 52 and 54 of the amplifier tubes, 57 and 60 (Fig. 1b) at their common grid load 53. The input terminals 52 and 54 may be connected to the output terminals 19 and 20 of the input filter shown in Fig. 1. These two tubes should be matched and operated so that the signal will divide equally, giving signals at the plates of these two tubes 57 and 60 equal in amplitude and of the same phase.

Balancing of the plate loads for tubes 57 and 60 is accomplished by the potentiometer 69 connected between resistances 68 and 70. The center tap of potentiometer 69 is connected to the source of plate voltage at 74. The output terminals 72 and 73 of this balanced amplifier are connected to the plates of the tubes 57 and 60 through the condensers 67 and 71, respectively. The other circuit elements shown in Fig. 1b are conventional. Resistors 59 and 61, shunted by condensers 58 and 64, provide cathode bias for the tubes 57 and 60 while the potentiometers, 63 and 66, shunted by condensers 62 and 65, are connected to a common source of screen voltage 75 and afford screen voltage adjustments for the equalization of the operation of the tubes. A ground is shown at 55.

The upper tube 57 (Fig. 1b) is coupled to the grid of the tube 205 (Fig. 2a) by connecting terminals 72 (Fig. 1b) and 180 (Fig. 2a). The phaser, consisting of coil 193 and condenser 194 in Fig. 2a is similar to that described in Fig. 2 (151 and 152) and is included in the plate circuit of tube 57 (Fig. 1b), above the input point to the grid of tube 205, with the modification of the mesh consisting of resistances 198 and 199 and condensers 196 and 197 for bucking stray capacity coupling through the grid load 187. The condenser 191 is used to couple this mesh to the top of the phaser and to impose the same phase alteration as imposed upon the signal by condenser 189. The resistance 188 and condenser 189 serve as a tube noise suppressor. Resistance 192 matches the phase and voltage effect of the resistance 188. Switch 195 may be provided for convenience in adjusting the circuit and shield 200 prevents variations in capacity to ground during tuning (Fig. 2a).

The output of the other tube 60 in Fig. 1b is connected to the cathode input load (185 in Fig. 2a), by joining the terminals 73 (Fig. 1b) and 181 (Fig. 2a) and ground 183, common to ground 55 in Fig. 1b. The condenser 182 and resistance 184 compensate for resistance 188 and condenser 189 in the grid input circuit. Provision is made for the equalization of signal voltages by the resistance 187 and provision is made for cancelling capacitive transfer through tube 211. See resistance 201 and condensers 202 and 203. This mesh also provides for the phase equalization of the signal between the inputs to the two tubes 205 and 211. Condenser 204 isolates the grid-cathode bias arrangement of tube 211 from ground, and condenser 186 matches the stray capacity of the phaser shield 200.

In the output of the tube 205 is the resistance 218 and the condenser 217 to compensate for the cathode mesh in the lower tube 211. The plate circuits of tubes 205 and 211 are connected by the common output terminals 227 and 228 to a load (not shown) which may be reactive through the tube noise suppressors 223–225 and 224–226. The potentiometer 220, connected to the plate supply voltage at terminal 230 through the filter, consisting of resistance 221 and condenser 222, provides a means of equalizing the plate voltage supply loads.

The coils 208 and 214 in Fig. 2a serve to absorb the screen partition impulses. The other circuit elements in Fig. 2a are conventional: resistors 206 and 212, shunted by condensers 207 and 213, provide the input bias to tubes 205 and 211, while the potentiometers 209 and 215, connected to the common screen voltage terminal 229, and shunted respectively by condensers 210 and 216, provide voltage adjustments for the screens of tubes 205 and 211.

Fig. 2b shows the signal splitting arrangement and signal phaser consisting of coil 253 and condenser 254 incorporated in the input circuit of two tubes 267 and 271 and shows a double-primary output transformer consisting of coils 284, 285 and 286. Signal splitting here is accomplished by using two aerials 250 and 261 connected to the apparatus circuit at terminals 251 and 262. These aerials are constructed so that each is equally disposed to the radio field, regardless of the direction of that field, and designed so as to cancel inductive coupling. See Fig. 2c. The cross-overs are in a plane perpendicular to the plane of the paper and separated by a distance equal to the distance between vertical members. There should be the same number of transposition sections presented to the radio field from any point of view. One of the aerials is indicated in Fig. 2c by 296—297, and the other by 298—299.

One of the aerials 250 in Fig. 2b is connected to the phaser, consisting of coil 253 and condenser 254, through the condenser 252 and through the phaser to the variable grid load resistance 260. This phaser is enclosed by a shield 258 connected to the top of the grid resistance 260 for the purpose of maintaining the value of capacity to ground constant. Attached to condenser 254 is a switch 255 which closes when the condenser is turned to the extreme maximum setting. This is for convenience in adjusting the circuit.

The phaser circuit consisting of coil 253 and condenser 254 in Fig. 2b is subject to oscillation under the impact of noise impulses (a conservative system possessing two interchangeable modes of energy storage) and, although not in the direct voltage amplifier cascade, is coupled to the input of tube 271 through aerial-ground capacity and the grid load 260. In order to counteract this effect energy from the phaser is fed through condenser 257 and resistance 256. When the condenser 257 is properly adjusted the spurious signal voltage caused by noise impulses upon the phaser are impressed across resistance 256, balancing the corresponding effect across resistance 260. A condenser, not shown in Fig. 2b but shown at 256a in Fig. 2e, may be shunted across resistance 256 to compensate for the phase angle change caused by the stray capacity 259 between the phaser shield 258 and ground. The ground connection 269 completes the aerial circuit.

Aerial 261 is connected to the cathode load 265 of tube 267 through condenser 263. Potentiometer 260 affords means for equalizing the signals through the two tubes 267 and 271. Condenser 264 compensates for the capacity to ground 259 from the phaser shield 258. Potentiometer 266, through which the grounded grid is grounded, assists in neutralizing the cathode-anode capacity coupling in tube 267.

In Fig. 2b the outputs of the tubes 267 and 271 are connected to the primaries 284 and 286 of the transformer through tube noise suppressors 282—283 and 280—281, each consisting of a condenser and resistance in series. This transformer is provided with a means for equalizing the coupling between the two primaries, coils 284 and 286, and the secondary coil 285. It is also provided with a differential condenser 287 for equalizing the capacity coupling. The secondary 285, shunted by tuning condenser 288, is connected to the output terminal 293 through the tube noise suppressor consisting of condenser 290 and resistance 291. Terminals 293 and 294 afford connection to the following stage. Resistance 292 is the grid resistance of the following tube which is not shown. Potentiometer 278, serving to equalize the voltage feed loads of tubes 267 and 271, is connected to the plate voltage supply terminal 295 through the filter consisting of resistance 277 shunted by condenser 276.

Other circuit elements shown in Fig. 2b are conventional. Resistance 272, shunted by condenser 273, provides the input bias for tube 271 while resistors 268 and 274, shunted by condensers 270 and 275, respectively, are screen voltage dropping resistors.

It is possible to use these two tubes 267 and 271 as grid input tubes by employing the output transformer for reversal. To do this, the connections to coil 286 should be reversed, the differential condenser 287 may be eliminated if desired and coils 284 and 286 shielded from the secondary coil 285 and condenser 288 by a Faraday shield (not shown in Fig. 2b). See Fig. 2e. Faraday shields 279 and 289 are used to control unbalanced capacity coupling between the primary coils 284 and 286 and the secondary 285. The differential condenser 287 (shown in Fig. 2b) may be employed is desired. The Faraday shields 279 and 289 may be omitted if desired. In Fig. 2e other numbers similar to those in Fig. 2b refer to similar parts. Note that resistor 265, which is shunted by a condenser 264, is in the grid circuit of tube 267 in Fig. 2e and that the resistor 266a is the cathode bias resistor of tube 267 and is shunted by a bypass condenser 266b.

Fig. 2d shows a simplified circuit of the linear interference degenerator employing a single tube with few circuit corrections and made possible by utilizing low values of input grid and cathode loads. Successful operation depends upon the reduction of phase relations by the use of these low values of grid and cathode resistances and upon a capacity coupling between aerials 301 and 312 to ground through resistance 316 of a very low value in comparison to the capacity setting of condenser 305. In this simplified version the values of the input resistances 311 and 316 should be of the order of a few hundred ohms.

The aerials 301 and 312 in Fig. 2d should be of equal dimensions, equally disposed to the radio field, should avoid inductive coupling and, as far as possible, capacitive coupling between each other. A transposition aerial such as described in Fig. 2c may be used. In operation this circuit shown in Fig. 2d may be regarded as a bridge circuit. At the top the two aerials are connected in a common field (or may be joined by connecting terminals 302 and 313 as shown in Fig. 2g) and at the bottom the two aerial circuits terminate in the common ground 310. The condenser 314 is set equal to condenser 303 to provide two equal bridge arms and resistance 311 is adjusted to equal resistance 316. Condenser 315 is set to match the stray capacity 308 between the phaser shield 307 and ground, giving the same phase and voltage across the two resistances 311 and 316. One of these bridge points (the top of resistance 311) is connected to the grid of tube 317 and the other (the top of resistance 316) is connected to the cathode of tube 317. With the phaser, consisting of coil 304 and condenser 305, shorted by the switch 306, equal signal voltages, including desired signal and interfering impulses, are applied to the grid and cathode of tube 317. With proper adjustments, allowing for a slight difference in amplification between these two inputs, the signal voltage, for all frequencies, will be zero at the plate of tube 317. The phaser, consisting of coil 304 and condenser 305, upon being tuned to resonance with the desired radio signal, produces a phase change in the desired signal which will approach 180° if the impedance across coil 304 is high in comparison to the value of the resistance 311 (shunted by capacity 308). In this manner the radio signal from the grid input is added in phase to the radio signal from the cathode input at the plate of tube 317 while the noise impulses, being of a much lower effective "frequency" are unaffected, relatively, by the phaser causing the noise signal to cancel at the plate of tube 317.

The plate voltage supply at terminal 326 in Fig. 2d is applied to the plate of tube 317 through the load resistance 321 and the screen voltage, through the resistor 320, shunted by condenser 318. The output is applied across resistance 323 through condenser 322. The output terminals 324 and 325 are connected to the next stage of amplification or other utilization device.

Two phasers may be employed in any of these interference degenerator designs shown in Figs. 2, 2a, 2b, 2d, and 2e. See Fig. 2f. In Fig. 2f coil 327 and condenser 328 constitute a second phaser, inserted between aerial condenser 314 and the cathode resistor 316, affording additional control of the radio signal phase reversal. A switch 329 similar to 306 may be used if desired in making initial adjustments and 319 is a phaser shield, connected to the cathode of tube 317 in Fig. 2f. Other numbers in Fig. 2f refer to parts similar to those of corresponding numbers in Fig. 2d.

One aerial may be substituted for the two aerials 250 and 261 in Fig. 2b and aerials 301 and 312 in Fig. 2d by connecting the aerial inputs 251 and 262 in Fig. 2b and 302 and 313 in Fig. 2d, together. See Fig. 2g. Numbers in Fig. 2g refer to the same parts as corresponding numbers in Fig. 2f. This increases the capacity coupling to ground, however, and increases the noise ratio.

Shielding, not described in the above disclosure, should be adequate to prevent the entrance of noise impulses and desired signals excepting through the aerial and to prevent undesirable coupling between circuit components.

I am aware that the device herein described is susceptible of consideration variation without departing from the spirit of my invention, and therefore, I have claimed my invention broadly as indicated by the appended claims.

Having thus described my invention what I claim as new and useful and desire to secure by United States Letters Patent is:

1. An atmospheric-noise interference degenerator for a radio wave-signal receiver comprising: an aperiodic aerial connected to the input of an RC aperiodic filter terminating in a filter output resistor, two matched thermionic tubes capable of linear amplification, the control grids of said thermionic tubes connected to the above said filter output resistor, with associated aperiodic input, output and voltage control circuits, the components of said circuits consisting of resistors and capacitors, said components having values selected to provide linear and equal operation of the said two matched thermionic tubes, said thermionic tubes provided with parallel plate feed resistors, the plate terminals of said thermionic tubes connected to two parallel circuit branches, the first circuit branch of the said two parallel circuit branches connected to the plate of the first thermionic tube of the above said two matched thermionic tubes and the second circuit branch of the said two parallel circuit branches connected to the plate of the second thermionic tube of the above said two matched thermionic tubes, the signal path to ground for the said first circuit branch provided by a series arrangement of a first tube-noise suppressor consisting of a resistor and capacitor in series, a tuned phaser consisting of an inductance and variable capacitor in parallel, and a first grounding resistor consisting of an adjustable resistor of low value relative to the wave-signal impedance of the said tuned phaser, a shield surrounding the said phaser connected to the said first circuit branch at a point between the said phaser and the said first grounding resistor, the signal path to ground for the second branch of the above said two parallel circuit branches provided by a series arrangement of a second tube-noise suppressor and a second grounding resistor shunted by a small adjustable capacitor, said second tube-noise suppressor consisting of a resistor and capacitor in series and having resistive and capacitive values to match the respective component values of above said first tube-noise suppressor, a third and a fourth thermionic tube each with associated aperiodic input, output and voltage control circuits, the components of said circuits consisting of resistors and capacitors, said components having assigned values providing linear and equal operation of said third and fourth thermionic tubes, the control grid of said third thermionic tube connected to the first circuit of the above said two parallel circuit branches through two grid circuit branches, the first said grid circuit branch consisting of a resistor and adjustable capacitor in parallel and connected between the grid of the said third thermionic tube and the top of the first grounding resistor and the second of the said two grid circuit branches consisting of a parallel arrangement of a resistor and adjustable capacitor followed by a tube-noise suppressor and connected between the grid of said third thermionic tube and the top of the above said tuned phaser, the first said grid circuit branch and the second said grid circuit branch having assigned values of components to form two sides of a balanced bridge, the first of the other two sides of the said balanced bridge consisting of the above said first grounding resistor shunted by stray capacity to ground, the second of the other two sides of the said balanced bridge consisting of the above said first tube-noise suppressor acting in series with the parallel effect of the plate load resistance and shunting capacity and the plate resistance and plate output capacity of the above said first thermionic tube, the cathode of said fourth thermionic tube connected to the second circuit of the above said two parallel circuit branches at the top of the above said second grounding resistor, and the output of the above said third and fourth thermionic tubes connected to a common output terminal, each through a separate tube-noise suppressor, said tube-noise suppressors each consisting of a resistor and a capacitor in series and having equal component values of resistance and equal component values of capacitance, and the common output circuit of said third and fourth thermionic tubes provided with utilization means connected to above said common output terminal for deriving from the aforesaid atmospheric-noise interference degenerator wave signals relatively free from atmospheric noise.

2. An atmospheric-noise interference degenerator for a radio wave-signal receiver comprising: an aerial non-resonant in and near the frequency band of the said radio wave-signal receiver and connected to ground through a grid resistor, two similar thermionic tubes capable of linear amplification, the control grids of said two thermionic tubes connected to said grid resistor, said thermionic tubes provided with aperiodic input, output and voltage control circuits, the components of said circuits having values selected to provide linear and equal operation of the said two similar thermionic tubes, said thermionic tubes provided with parallel plate feed resistors, the output terminals of said thermionic tubes connected to two parallel circuit branches, the first circuit branch of the said two parallel circuit branches connected to the output terminal of the first thermionic tube of the above said two similar thermionic tubes and the second circuit branch of the said two parallel circuit branches connected to the output terminal of the second thermionic tube of the above said two similar thermionic tubes, the signal path to ground for the said first circuit branch provided by a series arrangement of a first tube-noise suppressor consisting of a resistor and a capacitor in series, a tuned phaser consisting of inductance and capacitance in parallel, and a first grounding resistor consisting of an adjustable resistor of low value relative to the wave-signal impedance of the said tuned phaser, a shield surrounding the said phaser connected to the said first circuit branch at a point between the said phaser and the said first grounding resistor, the signal path to ground for the second branch of the above said two parallel circuit branches provided by a series arrangement of a second tube-noise suppressor and a second grounding resistor shunted by a small adjustable capacitor, said second tube-noise suppressor consisting of a resistor and capacitor and having resistive and capacitive values to match the respective component values of above said first tube-noise suppressor, a third and a fourth thermionic tube each with associated aperiodic input, output and voltage control circuits, the components of said circuits having assigned values providing linear and equal operation of said third and fourth thermionic tubes, the control grid of said third thermionic tube connected to the first circuit of the above said two parallel circuit branches through two grid circuit branches, the first said grid circuit branch consisting of an adjustable capacitor and resistor in parallel and connected between the grid of the said third thermionic tube and the top of the said first grounding resistor and the second of the said two circuit branches consisting of a resistor and adjustable capacitor in parallel and connected in series with a tube-noise suppressor between the grid of said third thermionic tube and the top of the above said tuned phaser, the said first grid circuit branch and the said second grid circuit branch having assigned values of components to form two sides of a balanced bridge, the first of the other two matching sides of the said balanced bridge consisting of the above said first grounding resistor shunted by stray capacity to ground, the second of the other two matching sides of the said balanced bridge consisting of the above said first tube-noise suppressor acting in series with the parallel effect of the plate load resistance and shunting capacity and the plate resistance and plate output capacity of the above said first thermionic tube, the cathode of said fourth thermionic tube connected to the second circuit of the above said two parallel circuit branches at the top of the above said second grounding resistor, the output of the above said third and fourth thermionic tubes connected to a common output terminal, each through a separate tube-noise suppressor, said tube-noise suppressors each consisting of a resistor and capacitor in series and having equal component values of resistance and equal component values of capacitance, and the common output circuit of said third and fourth thermionic tubes provided with utilization means connected to the above said common output terminal for deriving from the aforesaid atmospheric-noise interference degenerator wave signals relatively free from atmospheric noise.

3. An atmospheric-noise interference degenerator for a radio wave-signal receiver comprising: an aerial non-resonant in and near the frequency band of the said radio wave-signal receiver and connected to the input terminal of an RC aperiodic filter terminating in a filter output resistor, two similar thermionic tubes capable of linear amplification, the control grids of said two similar thermionic tubes connected to the said filter output resistor, said two similar thermionic tubes provided with aperiodic input, output and voltage control circuits, the components of said circuits having values selected to provide linear and equal operation of the said two similar thermionic tubes, the output terminals of said thermionic tubes connected to two parallel circuit branches, the first circuit branch of the said two parallel circuit branches connected to the output terminal of the first thermionic tube of the above said two similar thermionic tubes and the second circuit branch of the said two parallel circuit branches connected to the output terminal of the second thermionic tube of the above said two similar thermionic tubes, the signal path to ground for the said first circuit branch provided by a series arrangement of a tuned phaser comprising inductance and capacitance in parallel, and a first grounding resistor, a shield surrounding the said phaser connected to the said first circuit branch at a point between the said phaser and the said first grounding resistor, the signal path to ground for the second branch of the above said two parallel circuit branches provided by a second grounding resistor shunted by an adjustable capacitor, a third and a fourth thermionic tube each with associated aperiodic input, output and voltage control circuits, the components of said circuits having assigned values providing for linear and equal operation of said third and fourth thermionic tubes, the control grid of said third thermionic tube connected to the first circuit of the above said two parallel circuit branches through two grid circuit branches, the first of said two grid circuit branches consisting of an adjustable capacitor and resistor in parallel and connected between the grid of the said third thermionic tube and the top of the said first grounding resistor and the second of the said two circuit branches consisting of a parallel arrangement of a resistor and adjustable capacitor connected between the grid of said third thermionic tube and the top of the above said phaser, the first of said two grid circuit branches and the second of said two grid circuit branches having assigned values of components to form two sides of a balanced bridge, the first of the other two matching sides of the said balanced bridge consisting of the above said first grounding resistor, shunted by stray capacity to ground, the second of the other two matching sides of the said balanced bridge consisting of the resistive and capacitive values associated with the output circuit of the above said first thermionic tube, the cathode of said fourth thermionic tube connected to the second circuit of the above said two parallel circuit branches at the top of the above said second grounding resistor, the output terminals of the above said third and fourth thermionic tubes connected to a common output terminal, and the common output circuit of the said third and fourth thermionic tubes provided with utilization means connected to said output terminal for deriving from the aforesaid atmospheric-noise interference degenerator radio wave-signals relatively free from atmospheric noise.

4. An atmospheric-noise interference degenerator for a radio wave-signal receiver comprising: an aerial non-resonant in and near the frequency band of the said radio wave-signal receiver and connected to the input terminal of an RC aperiodic filter terminating in a filter output resistor, two similar thermionic tubes capable of linear amplification, the control grids of said two similar thermionic tubes connected to the said filter output resistor, said two similar thermionic tubes provided with aperiodic input, output and voltage control circuits, the components of said circuits having values selected to provide linear and equal operation of the said two similar thermionic tubes, the output terminals of said thermionic tubes connected to two parallel circuit branches, the first circuit branch of the said two parallel circuit branches connected to the output terminal of the first thermionic tube of the above said two similar thermionic tubes and the second circuit branch of the said two parallel circuit branches connected to the output terminal of the second thermionic tube of the above said two similar thermionic tubes, the signal path to ground for the said first circuit branch provided by a series arrangement of a first tube-noise suppressor consisting of a resistor and capacitor in series, a tuned phaser comprising inductance and capacitance in parallel, and a first grounding resistor, a shield surrounding the said phaser connected to the said first circuit branch at a point between the said phaser and the said first grounding resistor, the signal path to ground for the second branch of the above said two parallel circuit branches provided by a series arrangement of a second tube-noise suppressor and a second grounding resistor shunted by a small adjustable capacitor, said second tube-noise suppressor consisting of a resistor and capacitor having resistive and capacitive values to match the respective component values of above said first tube-noise suppressor, a third and fourth thermionic tube each with associated aperiodic input, output and voltage control circuits, the components of said circuits having assigned values providing linear and equal operation of said third and fourth thermionic tubes, the control grid of said third thermionic tube connected to the first circuit of the above said two parallel circuit branches at the top of the said first grounding resistor, the cathode of the said fourth thermionic tube connected to the second circuit of the above said two parallel circuit branches at the top of the above said second grounding resistor, the output of the above said third and fourth thermionic tubes connected to a common output terminal, each through a separate tube-noise suppressor, said tube-noise suppressors each consisting of a resistor and capacitor in series and having equal component values of resistance and equal component values of capacitance, and the common output circuit of said third and fourth thermionic tubes provided with utilizing means connected to above said common output terminal.

5. An atmospheric-noise interference degenerator for a radio wave-signal receiver comprising: an aerial non-resonant in and near the frequency band of the said radio wave-signal receiver and connected to ground through a grid resistor, two similar thermionic tubes with the control grids connected to said grid resistor, the output terminals of said two similar thermionic tubes connected to two parallel circuit branches, the first circuit branch of the said two parallel circuit branches connected to the output terminal of the first of the above said two similar thermionic tubes and the second circuit branch of the said two parallel circuit branches connected to the output terminal of the second thermionic tube of the above said two similar thermionic tubes, the signal path to ground for the first circuit branch provided by a series arrangement of a tuned phaser consisting of an inductor and variable capacitor in parallel and a first grounding resistor, a shield surrounding the said phaser and connected to the said first circuit branch at a point between the said phaser and the said first grounding resistor, the signal path to ground for the second branch of the above said two parallel circuit branches provided by a second grounding resistor shunted by a small adjustable capacitor, a third and a fourth thermionic tube having similar characteristics and having component circuit values providing linear and equal operation of said third and fourth thermionic tubes, the control grid of said third thermionic tube connected to the first circuit of the above said two parallel circuit brances through two grid circuit branches, the first of said two grid circuit branches consisting of an adjustable capacitor and resistor in parallel and connected between the grid of the said third thermionic tube and the top of the said first grounding resistor and the second of the said two grid circuit branches consisting of a parallel arrangement of a resistor and adjustable capacitor connected between the grid of said third thermionic tube and the top of the above said tuned phaser, the first of the above said two grid circuit branches and the second of the above said two grid circuit branches having assigned values of components to form two sides of a balanced bridge, the first of the other two matching sides of the said balanced bridge consisting of the above said first grounding resistor shunted by stray capacity to ground, the second of the other two matching sides of the said balanced bridge consisting of the resistive and capacitive values associated with the output circuit of the above said first thermionic tube, the cathode of said fourth thermionic tube connected to the second circuit of the above said two parallel circuit branches at the top of the above said second grounding resistor, the output of the above said third and fourth thermionic tubes connected to a common output terminal, and the common output circuit of said third and fourth thermionic tubes provided with utilization means connected to above said common output terminal for deriving from the aforesaid atmospheric-noise interference degenerator radio wave-signals relatively free from atmospheric noise.

6. An atmospheric-noise interference degenerator for a radio wave-signal receiver comprising: an aerial non-resonant in and near the frequency band of the said radio wave-signal receiver and connected to ground through a grid resistor, two similar thermionic tubes with control grids connected to said grid resistor, the output terminals of said thermionic tubes connected to two parallel circuit branches, the first circuit branch of the said two parallel circuit branches connected to the output terminal of the first thermionic tube of the above said two similar thermionic tubes and the second circuit branch of the said two parallel circuit branches connected to the output terminal of the second thermionic tube and the above said two similar thermionic tubes, the signal path to ground for the first circuit branch provided by a series arrangement of a first tube-noise suppressor consisting of a resistor and capacitor in series, a tuned phaser consisting of an inductor and variable capacitor in parallel and a first grounding resistor, a shield surrounding the said phaser connected to the said first circuit branch at a point between the said phaser and the said first grounding resistor, the signal path to ground for the second branch of the above said two parallel circuit branches provided by a series arrangement of a second tube-noise suppressor and a second grounding resistor shunted by a small adjustable capacitor, said second tube-noise suppressor consisting of a resistor and capacitor having resistive and capacitive values to match the respective component values of above said first tube-noise suppressor, a third and fourth thermionic tube having similar characteristics and having component circuit values providing linear and equal operation of said third and fourth thermionic tubes, the control grid of said third thermionic tube connected to the first circuit of the above said two parallel circuit branches at the top of the said first grounding resistor, the cathode of the said fourth thermionic tube connected to the second circuit of the above said two parallel circuit branches at the top of the above said second grounding resistor, the output of the above said third and fourth thermionic tubes connected to a common output terminal, each through a separate tube-noise suppressor, said tube-noise suppressors each consisting of a resistor and capacitor in series and having equal component values of resistance and equal component values of capacitance, and the common output circuit of said third and fourth thermionic tubes provided with utilization means connected to above said common output terminal.

7. An atmospheric-noise interference degenerator for a radio wave-signal receiver comprising: an aerial non-resonant in and near the frequency band of the said radio wave-signal receiver and connected to the input terminal of an RC aperiodic filter terminating in a filter output resistor, two similar thermionic tubes with input terminals connected to said filter output resistor, the output terminals of said two similar thermionic tubes connected to two parallel circuit branches, the first circuit branch of the said two parallel circuit branches connected to the output terminal of the first tube of the above said two similar thermionic tubes and the second circuit branch of the above said two parallel circuit branches connected to the output terminal of the second thermionic tube of the above said two similar thermionic tubes, the signal path to ground for the said first circuit branch provided by a series arrangment of a tuned phaser consisting of an inductor and capacitor in parallel and a first grounding resistor, a shield surrounding the said phaser connected to the first of said two parallel circuit branches at a point between the said phaser and the said first grounding resistor, the signal path to ground for the second branch of the above said two parallel circuit branches provided by a second grounding resistor shunted by a small adjustable capacitor, a third and a fourth thermionic tube having similar characteristics and having component circuit values providing for linear and equal operation of said third and fourth thermionic tubes, the control grid of said third thermionic tube connected to the first circuit branch of the above said two parallel circuit branches at the top of the said first grounding resistor, the cathode of the said fourth thermionic tube connected to the second circuit of the above said two parallel circuit branches at the top of the above said second grounding resistor, the output of the above said third and fourth thermionic tubes connected to a common output terminal, and the common output circuit of said third and fourth thermionic tubes provided with utilization means connected to above said common output terminal for deriving from the aforesaid atmospheric-noise interference degenerator radio wave-signals relatively free from atmospheric noise.

8. An atmospheric-noise interference degenerator for a radio wave-signal receiver comprising: an aerial non-resonant in and near the frequency band of the said radio wave-signal receiver and connected to ground through a grid resistor, two similar thermionic tubes with input terminals connected to said grid resistor, the output terminals of said two similar thermionic tubes connected to two parallel circuit branches, the first circuit branch of the said two parallel circuit branches connected to the output terminal of the first tube of the above said two similar thermionic tubes and the second circuit branch of the above said two parallel circuit branches connected to the output terminal of the second thermionic tube of the above said two similar thermionic tubes, the signal path to ground for the said first circuit branch provided by a series arrangement of a tuned phaser consisting of an inductance and a capacitance in parallel and a first grounding resistor, a shield surrounding the said phaser connected to the said first circuit branch at a point between the said phaser and the said first grounding resistor, the signal path to ground for the second branch of the above said two parallel circuit branches provided by a second grounding resistor shunted by a small adjustable capacitor, a third and a fourth thermionic tube having similar characteristics and having component circuit values providing for linear and equal operation of said third and fourth thermionic tubes, the control grid of said third thermionic tube connected to the first circuit of the above said two parallel circuit branches at the top of the said first grounding resistor, the cathode of the said fourth thermionic tube connected to the second circuit of the above said two parallel circuit branches at the top of the above said second grounding resistor, the output of the above said third and fourth thermionic tubes connected to a common output terminal, and the common output circuit of said third and fourth thermionic tubes provided with utilization means connected to above said common output terminal.

9. An atmospheric-noise interference degenerator for a radio wave-signal receiver comprising: an aerial non-resonant in and near the frequency band of said radio wave-signal receiver, two similar thermionic tubes, the control grids of said thermionic tubes connected to said aerial and to a common grid resistor, the output terminals of said thermionic tubes connected to two parallel circuit branches, the first circuit branch of the said two parallel circuit branches connected to the output terminal of the first of the above said two similar thermionic tubes and a second circuit branch of the said two parallel circuit branches connected to the output terminal of the second thermionic tube of the above said two similar thermionic tubes, the signal path for the said first circuit branch provided by a series arrangement of a tuned phaser comprising an inductance and capacitance in parallel and a first grounding resistor, a shield surrounding the said phaser connected to the said first circuit branch at a point between the said phaser and the said first grounding resistor, the signal path to ground for the second branch of the above said two parallel circuit branches provided by a second grounding resistor shunted by an adjustable capacitor, a third thermionic tube with associated component circuit values providing for the linear operation of said third thermionic tube, the control grid of said third thermionic tube connected to the first circuit of the above said two parallel circuit branches through two grid circuit branches, the first of said two grid circuit branches consisting of an adjustable capacitor and a resistor in parallel and connected between the grid of said third thermionic tube and the top of the above said first grounding resistor and the second of the said two grid circuit branches consisting of a parallel arrangement of a resistor and adjustable capacitor connected between the grid of said third thermionic tube and the top of the above said tuned phaser, the cathode of said third thermionic tube connected to the second circuit of the above said two parallel circuit branches at the top of the above said second grounding resistor, the output of said third thermionic tube connected by a tube-noise suppressor to an output terminal, and the output circuit of the said third thermionic tube provided with utilization means connected to said output terminal for deriving from the aforesaid atmospheric-noise interference degenerator radio wave-signals relatively free from atmospheric noise.

10. In an atmospheric-noise interference degenerator for a radio wave-signal receiver comprising an essentially aperiodic aerial connected to ground through a grid resistor, two similar thermionic tubes, the input terminals of said thermionic tubes connected to said grid resistor, the output terminals of said two similar thermionic tubes connected to two parallel circuit branches, the signal path to ground for the first of the said two parallel circuit branches comprising a tuned phaser consisting of an inductance and capacitance in parallel and connected to ground in series with a first grounding resistor, a shield surrounding said phaser connected to the top of said first grounding resistor, the signal path to ground for the second of the said two parallel circuit branches provided by a second grounding resistor shunted by an adjustable capacitor, and a third and fourth thermionic tube providing linear amplification, the cathode of said fourth thermionic tube connected to the above said second circuit of the above said two parallel circuit branches at the top of the above said second grounding resistor, the output of the said third and fourth thermionic tubes connected to a common terminal; two grid circuit branches are provided connected between the grid of the above said third thermionic tube and the first of the above said two parallel circuit branches, the first of the said two grid circuit branches comprising an adjustable capacitor and resistor in parallel and connected between the grid of the said third thermionic tube and the top of above said first grounding resistor, the second of the said two grid circuit branches comprising a resistor and adjustable capacitor in parallel and connected between the grid of the said third thermionic tube and the top of the above said phaser, the said first grid circuit branch and the said second grid circuit branch having values of components determined to form two sides of a balanced bridge, the first of the two other matching sides of the said balanced bridge consisting of the above said first grounding resistor shunted by stray capacity to ground, the second of the other two matching sides of the said balanced bridge consisting of the resistive and distributed capacitive values associated with the output circuit of the thermionic tube connected to the above said first of the two parallel circuit branches, said balanced bridge thereby constituting means for cancelling the stray signal coupling from the top of the above said phaser to the grid of the above said third thermionic tube through ground and the above said first grounding resistor.

References Cited in the file of this patent

UNITED STATES PATENTS

| | | |
|---|---|---|
| 956,165 | Pickard | Apr. 26, 1910 |
| 1,562,056 | Rice | Nov. 17, 1925 |
| 1,688,554 | Ranger | Oct. 23, 1928 |